W. W. FRAZIER.
NUT LOCK.
APPLICATION FILED OCT. 14, 1916.
1,216,431.
Patented Feb. 20, 1917.
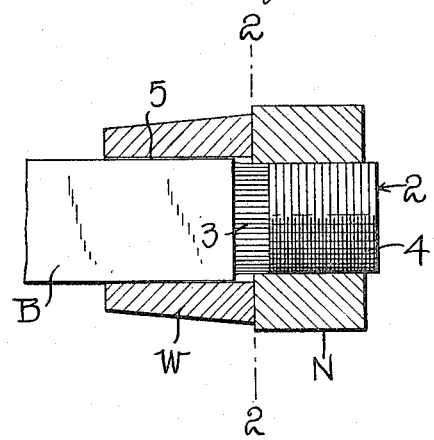
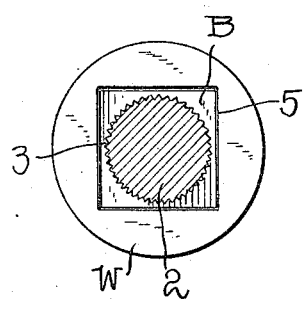
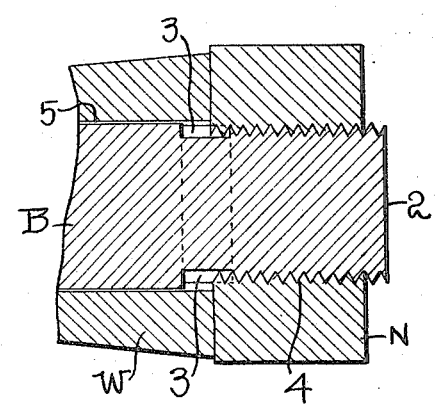
Inventor
W. W. FRAZIER
By Watson E. Coleman
Attorney

UNITED STATES PATENT OFFICE.

WALTER W. FRAZIER, OF PHILIPP, MISSISSIPPI.

NUT-LOCK.

1,216,431.  Specification of Letters Patent.  Patented Feb. 20, 1917.

Application filed October 14, 1916. Serial No. 125,690.

*To all whom it may concern:*

Be it known that I, WALTER W. FRAZIER, a citizen of the United States, residing at Philipp, in the county of Tallahatchie and State of Mississippi, have invented certain new and useful Improvements in Nut-Locks, of which the following is a specification, reference being had to the accompanying drawings.

This invention relates to certain improvements in nut locks and it is an object of the invention to provide a novel and improved nut lock whereby the nut is locked to the bolt and thereby held normally against retrograde movement.

The invention consists in the details of construction and in the combination and arrangement of the several parts of my improved nut lock whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view partly in section and partly in elevation illustrating a nut lock constructed in accordance with an embodiment of my invention;

Fig. 2 is a sectional view taken substantially on the line 2—2 of Fig. 1; and

Fig. 3 is an enlarged longitudinal sectional view taken through the device as disclosed in Fig. 1.

As disclosed in the accompanying drawings, B denotes a bolt having the major portion of its shank angular in cross section and having its outer or free extremity rounded, as indicated at 2, and with the periphery of said rounded portion at its inner end provided with the angular series of ribs 3 disposed longitudinally of the bolt B and the part of the periphery of the rounded portion 2 in advance of said ribs 3 is threaded, as indicated at 4 and with which the nut N is adapted to be engaged. It will be perceived that as the nut N is turned upon the bolt B the threads of said nut N will cut through the ribs 3 whereby said nut will be effectively locked against retrograde movement.

It has also been found of advantage to interpose between the nut N and the work the washer W, said washer W being provided with an opening or bore 5 angular in cross section and of the same configuration as the cross section of the shank of the bolt B, whereby said washer W is held against turning movement independently of the bolt when applied thereto.

The outer face of the washer W or that face which contacts with the nut N is of a diameter slightly less than the mean diameter of the nut N and said washer W gradually tapers toward the work, and when the bolt B and nut N are in applied relation, the washer W is adapted to bridge the space between said nut N and the work in order to assure the requisite engagement of the threads of the nut with the ribs 3 and to afford a frictional surface to further hold the nut N against retrograde movement.

From the foregoing description, it is thought to be obvious that a nut lock constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. In combination with a bolt provided with a threaded portion and with an annular series of ribs adjacent the inner end of the threaded portion, said ribs being disposed longitudinally of the bolt, and a nut engageable with the threaded portion of the bolt and adapted to cut through the ribs.

2. In combination with a bolt provided with a threaded portion and with an annular series of ribs adjacent the inner end of the threaded portion, said ribs being disposed longitudinally of the bolt, a nut engageable with the threaded portion of the bolt and adapted to cut through the ribs, the portion of the bolt inwardly of the ribs being angular in cross section, and a washer provided with an angular opening through which the angular portion of the bolt is directed, the outer face of said washer being adapted to frictionally contact with the inner face of the nut.

3. In combination with a bolt provided with a threaded portion and with an annular series of ribs adjacent the inner end of the threaded portion, said ribs being disposed longitudinally of the bolt, a nut engageable with the threaded portion of the bolt and adapted to cut through the ribs, the portion of the bolt inwardly of the ribs being angular in cross section, and a washer provided with an angular opening through which the angular portion of the bolt is directed, the outer face of said washer being adapted to frictionally contact with the inner face of the nut, said washer being tapered inwardly.

In testimony whereof I hereunto affix my signature in the presence of two witnesses.

WALTER W. FRAZIER.

Witnesses:
G. F. WILSON,
Mrs. J. B. RAY.

Copies of this patent may be obtained for five cents each, by addressing the "Commissioner of Patents, Washington, D. C."